(12) United States Patent
Davies et al.

(10) Patent No.: US 9,638,592 B2
(45) Date of Patent: May 2, 2017

(54) DIFFERENTIAL MOTION SENSOR

(71) Applicant: Hamilton Sundstrand Corporation, Windsor Locks, CT (US)

(72) Inventors: Stephen Davies, Shrewsbury (GB); Michael Carbone, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 277 days.

(21) Appl. No.: 14/510,594

(22) Filed: Oct. 9, 2014

(65) Prior Publication Data
US 2016/0103027 A1    Apr. 14, 2016

(51) Int. Cl.
*G01L 5/00*    (2006.01)
*B64D 45/00*   (2006.01)
*G01B 5/00*    (2006.01)
*G01B 5/14*    (2006.01)

(52) U.S. Cl.
CPC ............ *G01L 5/00* (2013.01); *B64D 45/0005* (2013.01); *G01B 5/0025* (2013.01); *G01B 5/14* (2013.01); *B64D 2045/001* (2013.01)

(58) Field of Classification Search
CPC .... G01B 5/0025; G01B 5/14; B64D 45/0005; B64D 45/00; B64D 2045/001; B64D 2045/0085; G01L 5/00; G01L 5/0085; H01H 35/006; H01H 85/10; H01H 85/02; H01H 85/2045
USPC ......................................................... 73/841
See application file for complete search history.

(56) References Cited

U.S. PATENT DOCUMENTS

| 4,899,600 | A  | * | 2/1990  | Lee    | G01G 7/06 177/210 C |
| 6,220,545 | B1 | * | 4/2001  | Fenny  | B64C 29/0033 244/7 R |
| 6,466,141 | B1 | * | 10/2002 | McKay  | B64C 13/00 244/213 |
| 6,483,436 | B1 | * | 11/2002 | Emaci  | B64D 45/0005 244/194 |
| 7,921,729 | B2 | * | 4/2011  | Conner | B64D 45/0005 340/686.1 |

(Continued)

FOREIGN PATENT DOCUMENTS

EP    2368794 A2    9/2011
EP    2390177 A2    11/2011

OTHER PUBLICATIONS

European Office Action; European Application No. 15189101.7; Date of Mailing: Feb. 8, 2016; 8 pages.

*Primary Examiner* — Michael A Lyons
*Assistant Examiner* — Philip Cotey
(74) *Attorney, Agent, or Firm* — Cantor Colburn LLP

(57) ABSTRACT

A differential motion sensor includes a base and a cradle. The base includes a first surface that extends along a first axis to define a length and a second axis to define a width. The base further includes at least one hinge that pivots about a rotational axis extending along the first axis. The cradle is pivotably coupled to the at least one hinge and is configured to move in the direction of the second axis when pivoting about the hinge. The differential motion sensor is configured to operate in a first mode when the cradle is aligned with the base and a second mode when the cradle is pivotably displaced with respect to the base.

10 Claims, 3 Drawing Sheets

(56) References Cited

U.S. PATENT DOCUMENTS

| | | | | |
|---|---|---|---|---|
| 8,115,649 B2* | 2/2012 | Moy | ................... | B64D 45/0005 244/194 |
| 8,827,213 B2* | 9/2014 | Peirce | ....................... | B64C 9/22 244/213 |
| 2009/0223791 A1* | 9/2009 | Conner | .............. | B64D 45/0005 200/61.62 |
| 2010/0277346 A1* | 11/2010 | Moy | ................... | B64D 45/0005 340/945 |
| 2011/0234237 A1* | 9/2011 | Mayer | ....................... | B64C 9/18 324/538 |
| 2011/0290945 A1* | 12/2011 | Peirce | ................ | B64D 45/0005 244/213 |
| 2012/0104178 A1* | 5/2012 | Carbone | ............ | B64D 45/0005 244/213 |
| 2015/0332881 A1* | 11/2015 | Carbone | .............. | H01H 35/006 200/61.08 |

\* cited by examiner

DIFFERENTIAL MOTION SENSOR

BACKGROUND OF THE INVENTION

The present disclosure generally relates to differential motion sensing and, more particularly, to slat differential motion sensors.

Differential motion sensors can be used to detect displacement of adjacent objects and/or components. Slat differential motion sensors, for example, can be used to detect displacements and skews of aircraft control surfaces, such as slats or flaps on aircraft wings. The displacement of the slats may be caused, for example, by an actuator disconnection from the surface it drives.

Conventional slat differential motion sensors typically employ two hinged arms configured to move independent from one another. The arms are connected by an electromechanical fuse. The slat differential motion sensor is typically mounted to a first panel, while a striker pin is connected to a second panel. A system controller is provided to monitor continuity at the fuse and the status of the sensor. When abnormal differential motion occurs, the fuse is loaded in tension (i.e., realizes a tensile force) and fractures the fuse, annunciating the failure to the system controller. Conventional slat differential motion sensors, however, are affected by the spanwise motion (i.e., motion parallel to the span of an aircraft wing) of the panels. Spanwise motion results in significant variation of forces acting upon the fuse which has to be designed to assure functional repeatability of skew detection without nuisance signaling to the system controller. Greater spanwise motion, for example, results in a lower pin force but a less sensitive sensor.

BRIEF DESCRIPTION OF THE INVENTION

According to a non-limiting embodiment, a differential motion sensor includes a base and a cradle. The base includes a first surface that extends along a first axis to define a length and a second axis to define a width. The base further includes at least one hinge that pivots about a rotational axis extending along the first axis. The cradle is pivotably coupled to the at least one hinge and is configured to move in the second direction when pivoting about the hinge. The differential motion sensor is configured to operate in a first mode when the cradle is aligned with the base and a second mode when the cradle is pivotably displaced with respect to the base.

According to another non-limiting embodiment, a method of detecting displacement of a first object with respect to a second object includes forming a base on the first object. The base includes a first surface extending along a first axis to define a length and a second axis to define a width. The method further includes pivotably connecting a cradle to the base such that the cradle is configured to move in the second direction. The method further includes detecting that the first and second objects are aligned with respect to one another when the cradle is aligned with the base, and detecting that the first and second objects are displaced with respect to one another when the cradle is pivotably displaced with respect to the base.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
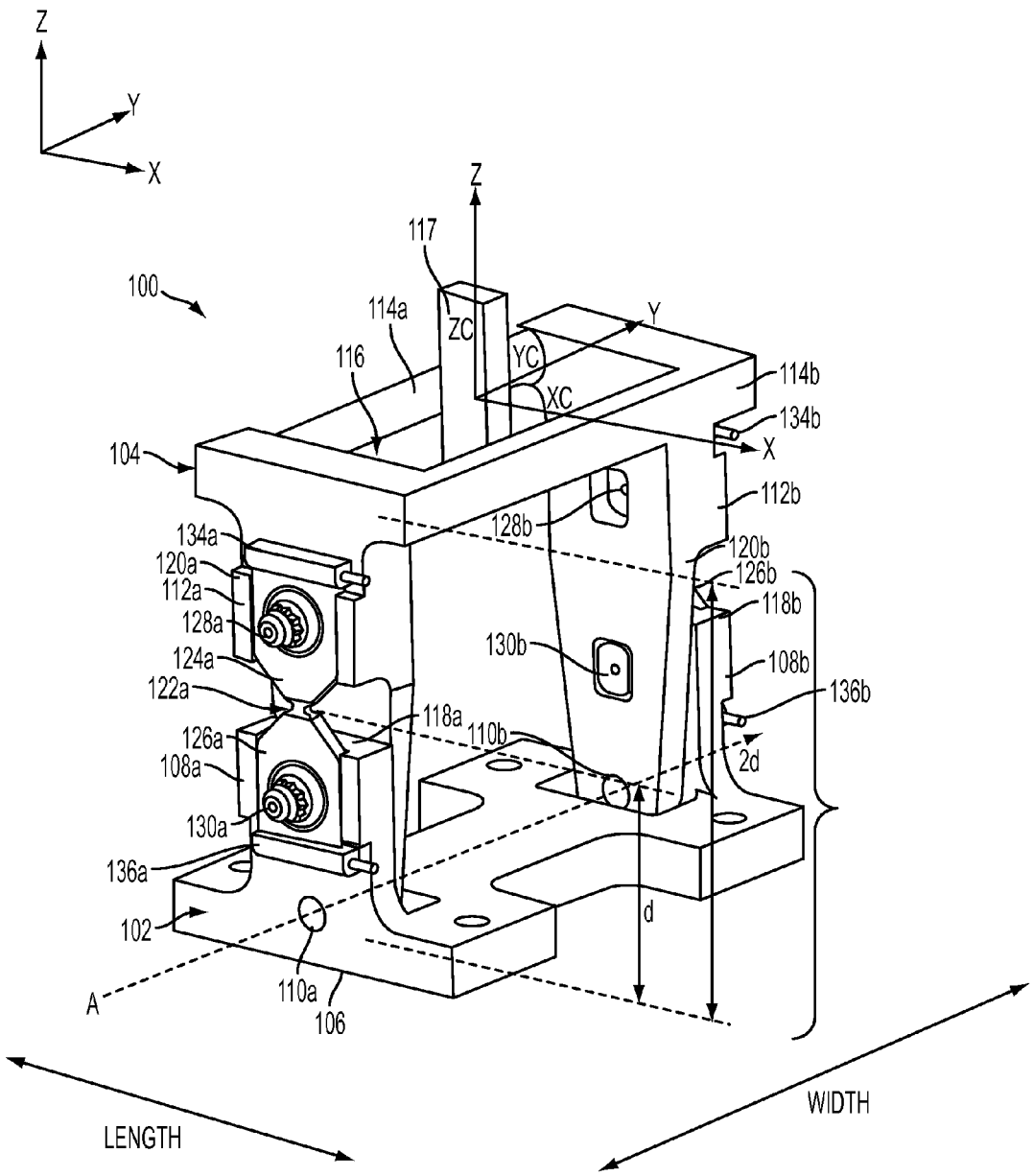
FIG. 1 is a perspective view of a differential motion sensor according to a non-limiting embodiment.

Referring now to FIG. 1, a differential motion sensor 100 is illustrated according to a non-limiting embodiment. The differential motion sensor 100 includes a base 102 and a cradle 104 pivotably connected to the base 102. The base 102 includes a first surface 106, a first base arm 108a, and a second base arm 108b. The base 102 extends along a first axis (e.g., an X-axis) to define length, a second axis (e.g., a Y-axis) perpendicular to the first axis to define a width, and a third axis (e.g., a Z-axis) perpendicular to the first and second axes to define a height. According to a non-limiting embodiment, the base 102 can be coupled against a surface of a first panel (not shown in FIG. 1) as discussed in greater detail below. The first base arm 108a extends from a first side of the base 102 in the Z-axis direction, and the second base arm 108b extends from a second side of the base 102 opposite the first side in the Z-axis direction. The first side of the base 102 includes a first hinge 110a and the second side of the base 102 includes a second hinge 110b. Each of the first and second hinges 110a/110b pivots about a rotational axis (A) extending along the Y-axis. The first and second hinges 110a/110b are both pivotably coupled to the cradle 104 as discussed in greater detail below.

The cradle 104 includes a first cradle arm 112a and a second cradle arm 112b disposed opposite the first cradle arm 112a. Each of the first and second cradle arms 112a/112b includes a first end and a second end. A surface of the cradle 104 includes a pair of opposing crossbars 114a/114b extending along the Y-axis and between the first end of the first and second cradle arms 112a/112b to define a cradle opening 116. The second end of the first cradle arm 112a is pivotably connected to the first hinge 110a, and the second end of the second cradle arm 112b is pivotably connected to the second hinge 110b. In this manner, the cradle 104 (and thus the cradle opening 116) is configured to move in the X-axis direction with respect to the base 102 when the first and second cradle arms 112a/112b pivot about the first and second hinges 110a/110b. The cradle opening 116 can receive a striker pin 117 that may be formed against a second panel (not shown in FIG. 1) as discussed in greater detail below.

The base arms 108a/108b each include a respective base recess 118a/118b formed therein, and the cradle arms each include a respective cradle recess 120a/120b formed therein. The differential motion sensor 100 further contains at least one conductive fuse. According to the non-limiting embodiment illustrated in FIG. 1, a first conductive fuse 122a and a second conductive fuse 122b are provided to improve reliability and monitoring redundancy (e.g. Channel A and Channel B) of the differential motion sensor 100. It is appreciated, however, that the differential motion sensor 100 can be formed with only a single conductive fuse. Each conductive fuse 122a/122b includes a cradle portion 124a/124b and a base portion 126a/126b. The cradle portion 124a/124b is disposed in a respective cradle recess 120a/120b and is supported therein via a cradle bolt 128a/128b. The base portion 126a/126b is disposed in a respective base recess 118a/118b and is supported therein via a base bolt 130a/130b. The cradle portion 124a/124b of the fuse and the base portion 126a/126b of the fuse are conductively connected to each other at a fracture region 132a/132b, which inhibits the discharge sensor from pivoting when a force (i.e., a shear force) applied to the fracture region 132a/132b is less than a fracturing force threshold. According to a non-limiting embodiment, the fracture region 132a/132b is interposed between the base 102 and the cradle 104.

Figure 2A:
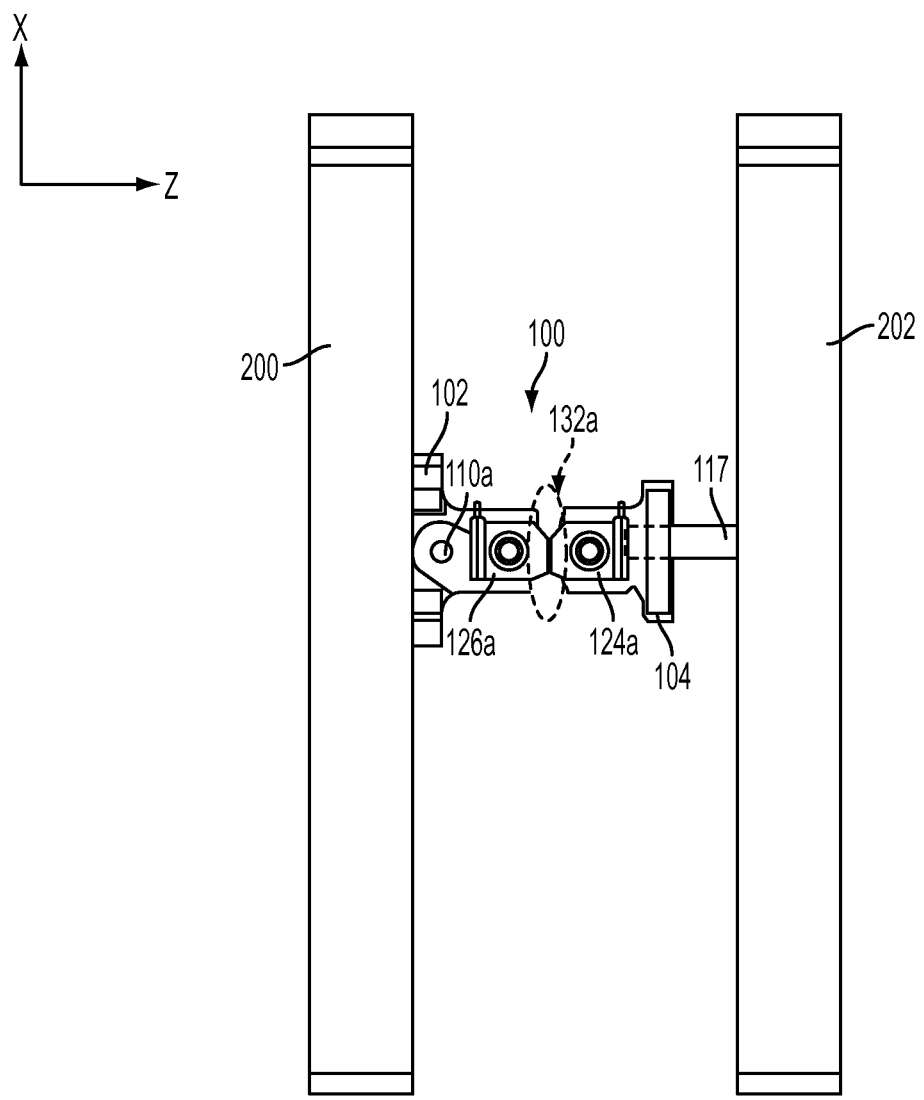
FIG. 2A is a side view of a differential motion sensor operating in a closed-circuit mode according to a non-limiting embodiment.

The differential motion sensor 100 according to the non-limiting embodiment of FIG. 2A is illustrated with a 2:1 cradle ratio. That is, the cradle arms 112a/112b have a length that is twice the length of the base arms 108a108b. Accordingly, a pin force of approximately 95 lbs, for example, would shear the fracture regions 132a/132b of the first and second conductive fuses 122a/122b, which each fracture at approximately 95 lbs. It is appreciated, however, the cradle ratio of the differential motion sensor 100 can be varied to provide a lower pin force/longer pin motion necessary to shear the fracture regions 132a/132b, or a higher pin force/shorter pin motion necessary to shear the fracture regions 132a/132b. In other words, the cradle ratio can be adjusted according to a particular design application of the differential motion sensor. If less force (e.g., pin force) is desired to pivot the cradle 104 and sever the conductive fuse 122a/122b, for example, the length of the cradle arms 112a/112b can be increased from twice the length of the base arms 108a/108b to three-times the length of the base arms 108a/108b. The pin force ($F_p$) can be calculated according to the equation:

$$F_p = 2F_S/(R_C) \text{ where,}$$

$F_p$=the pin force;
$F_S$=the shear force required to fracture each fuse; and
$R_C$=the cradle ratio.

Although the pin force ($F_p$) described in the equation above reflects an embodiment where two fuses 126a/126b are implemented such that two shear forces ($2F_S$) are considered, it is appreciated that the pin force ($F_p$) may be determined in a similar manner where only a single fuse 126 is implemented and thus a single shear force ($F_S$) is considered. The shear force ($F_S$) necessary to fracture the fuse loaded in shear is typically approximately 58% of the tensile force ($F_T$) necessary to fracture the fuse loaded in tension. Accordingly, at least one embodiment of the disclosure utilizes shear loading to sever the fracture regions 132/132b instead of tensile force (i.e., pulling force in the Z-direction) to provide a differential motion sensor 100 with increased sensitivity with respect to conventional sensors that operate according to tensile loading.

The first and second conductive fuses 122a/122b include one or more conductive terminals 134a/136a and 134b/136b. One or more wires (not shown) can be electrically connected to the terminals 134a/136a and 134b/136b. In this manner, electrical current provided from a power source (not shown) can flow from the terminals 134a/136a and 134b/136b, or vice versa, when the fracture region 132a/132b is conductively connected.

The differential motion sensor 100 is configured to operate in a first mode (e.g., a closed-circuit mode) and a second mode (e.g., an open-circuit mode) based on the position of the cradle 104 with respect to the base 102. For example, the differential motion sensor 100 is configured to operate in a first mode when the cradle 104 is aligned with the base 102, and a second mode when the cradle 104 is pivotably displaced (i.e., misaligned) with respect to the base 102. Displacing the cradle 104 with respect to the base 102 causes the conductive fuse 122a/122b to sever in the second mode.

According to a non-limiting embodiment, the differential motion sensor 100 operates in the first mode when the fracture region 132a/132b is conductively connected (i.e., not severed) such that current flows between the fuse terminals 134a/136a and 134b/136b. The differential motion sensor, however, operates in the second mode when the fracture region 132a/132b is not conductively connected (i.e., severed) such that current prevented from flowing between the terminals 134a/136a and 134b/136b. When the second mode is effected, a control module (not shown) can detect the stoppage of said current flow. In this manner, the control module can determine that a force applied to differential motion between the cradle 104 and the pin 117 has exceeded the threshold thereby severing one or more of the fracture regions 132a/132b and placing the differential motion sensor in the open-circuit mode.

Referring to FIG. 2A, the differential motion sensor 100 is illustrated in a closed-circuit mode according to a non-limiting embodiment. In this scenario, the base 102 is coupled to a first panel 200. A second panel 202 includes a striker pin 117. The striker pin 117 includes a first end connected to the second panel 202 and an opposing second end that extends into the cradle opening 116. The panels 200 and 202 normally move in unison together along the X-axis direction such that the striker pin 117 is stably maintained within the cradle opening 116. The striker pin 117, therefore, does not apply a force against either the first or second crossbars 114a/114b such that the cradle 104 is not forced to pivot. Accordingly, the force threshold is not exceeded and the fracture region 132a/132b remains electrically connected thereby maintaining the differential motion sensor in the closed-circuit mode.

Figure 2B:
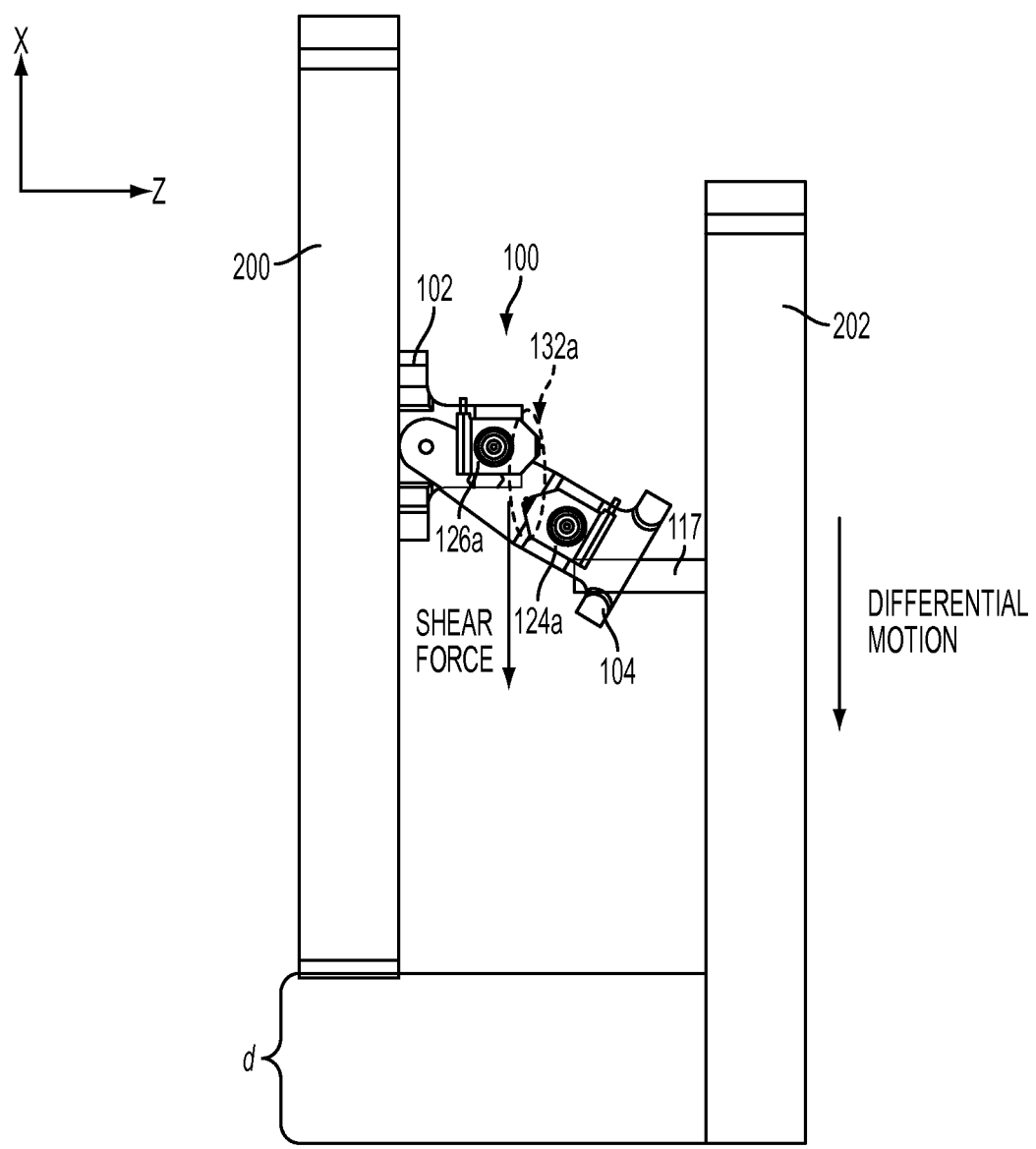
FIG. 2B illustrates the differential motion sensor of FIG. 2A operating in an open-circuit mode according to a non-limiting embodiment.

Turning now to FIG. 2B, the differential motion sensor 100 is illustrated in an open-circuit mode according to a non-limiting embodiment. In this scenario, the second panel 202 is displaced a distance (d) with respect to the first panel 200 such that the motions of the first and second panels 200/202 are not synchronized. As a result, the striker pin 117 is displaced in the pivoting direction of the cradle 104 (i.e., the X-axis) and contacts the second crossbar 114b, for example, thereby inducing a moment about the hinges 110a/110b which is resisted by the conductive fuses. When the moment exceeds the threshold, the fracture region 132a/132b of the first and/or second conductive fuses 122a/122b is fractured in shear and the cradle 104 is allowed to pivot further about the hinges 110a/110b and in the X-direction. The severed fracture region 132a/132b, however, disconnects (i.e., stops) current flow between the terminals 134a/136a and/or terminals 134b/136b thereby initiating the open-circuit mode of the differential motion sensor 100. In response to detecting the stoppage of current (i.e., the open-circuit mode), the control module determines that the first panel and/or the second panel are displaced.

According to at least one embodiment, the differential motion sensor 100 provides sense detection along a single axis. That is, the motion of the cradle 104 needed to fracture one or more of the fracture regions 132a/132b is in the X-axis direction, for example, and is independent of the Y-axis direction and the Z-axis direction. As a result, any relative spanwise motions between the surfaces being monitored, in either the Y-axis and/or Z axis directions, has no influence on the forces reacted at the fuse(s) and thereby resulting in a more predictable sensor performance. In addition, since the fracture regions 132a/132b oriented to fail in shear, as opposed to a tension, the necessary force applied by the striker pin 117 to sever the fracture region 132a/132b is reduced. Accordingly, the possibility of the first and second fracture regions 132a/132b remaining dormant (i.e., intact) following a striking force applied by the striker pin 117 is reduced.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc., are used to distinguish one element from another. Furthermore, the use of the terms a, an, etc. do not denote a limitation of quantity, but rather denote the presence of at least one of the referenced item.

What is claimed is:

1. A differential motion sensor configured to detect a shear force applied to an aircraft, comprising:
   a base including a first surface extending along a first axis to define a length and a second axis to define a width, and including at least one hinge that pivots about a rotational axis extending along the first axis;
   a cradle pivotably coupled to the at least one hinge and configured to move in a direction of the second axis when pivoting about the hinge; and
   at least one conductive fuse extending along a third axis that is perpendicular to both the first axis and the second axis, the at least one conductive fuse including first and second fuse portions connected to one another at a fracture region;
   wherein the fracture region extends along the second axis such that the first and second fuse portions are configured to sever at the fracture region when a shear force applied to the differential motion sensor along the second axis exceeds a force threshold of the at least one conductive fuse, and
   wherein the differential motion sensor is configured to operate in a first mode when the cradle is aligned with the base and a second mode when the cradle is pivotably displaced with respect to the base,
   a first conductive terminal connected to the first fuse portion and a second conductive terminal connected to the second fuse portion, the first and second conductive terminals configured to deliver electrical current through the at least one conductive fuse,
   wherein the differential motion sensor is configured to operate in a first mode in response to the current flowing through the at least one conductive fuse and a second mode in response to fracturing the at least one conductive fuse at the fracture region such that the current does not flow through the at least one conductive fuse.

2. The differential motion sensor of claim 1, wherein the first fuse portion and the second fuse portion each extending along the third axis.

3. The differential motion sensor of claim 1, wherein the fracture region is interposed between the cradle and the base.

4. The differential motion sensor of claim 3, wherein the cradle includes a second surface having an opening for receiving a striker pin.

5. The differential motion sensor of claim 4, wherein the base further comprises:
   a first base arm including a first hinge formed therein and a second base arm including a second hinge formed therein in, the first and second base arms formed at opposite ends of the base and extending therefrom along the third axis, and
   wherein the cradle further comprises:
   a first cradle arm including a first end coupled to the second surface and a second end pivotably coupled to the first hinge, a second cradle arm including a first end coupled to the second surface and a second end pivotably coupled to the second hinge.

6. The differential motion sensor arm of claim 5, where the first and second base arms have a first length, and the first and second cradle arms have a second length that is greater than the first length.

7. A method of detecting displacement of a first object installed on an aircraft with respect to a second object installed on the aircraft, the method comprising, comprising:
   forming a base on the first object, the base including a first surface extending along a first axis to define a length and a second axis to define a width, and
   pivotably connecting a cradle to the base such that the cradle is configured to move in a direction of the second axis;
   flowing current through at least one conductive fuse formed on the differential motion sensor, the at least one conductive fuse including first and second fuse portions connected to one another at a fracture region, the fracture region extending along the second axis;
   detecting that the first and second objects are aligned with respect to one another when the cradle when the current flows through the at least one conductive fuse, and detecting that the first and second objects are displaced with respect to one another when the cradle is pivotably displaced with respect to the base such that the first and second fuse portions sever at the fracture region in response to a shear force applied to the differential motion sensor along the second axis exceeding a force threshold of the at least one conductive fuse to disconnect current flow through the at least one conductive fuse.

8. The method of claim 7, further comprising detecting that the first and second objects are displaced with respect to one another based on the shear force.

9. The method of claim 8, further comprising pivoting the cradle about a rotational axis extending along the first axis to induce the shear force.

10. The method of claim 9, further comprising forming a first end of a striker pin to the second object and extending a second end of the striker pin into an opening formed in the cradle such that the striker pin applies the shear force on the at least one conductive fuse when the first and second objects are displaced with respect to one another.

* * * * *